Jan. 18, 1966 A. T. HOOPER 3,230,148
NUCLEAR FUEL COMPONENTS
Filed Aug. 1, 1963 5 Sheets-Sheet 2

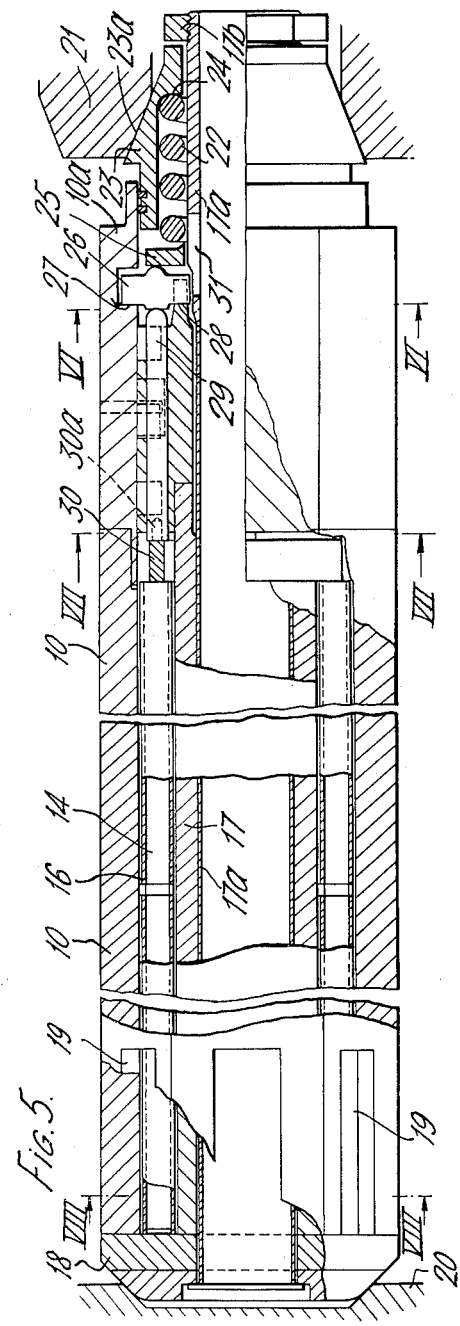

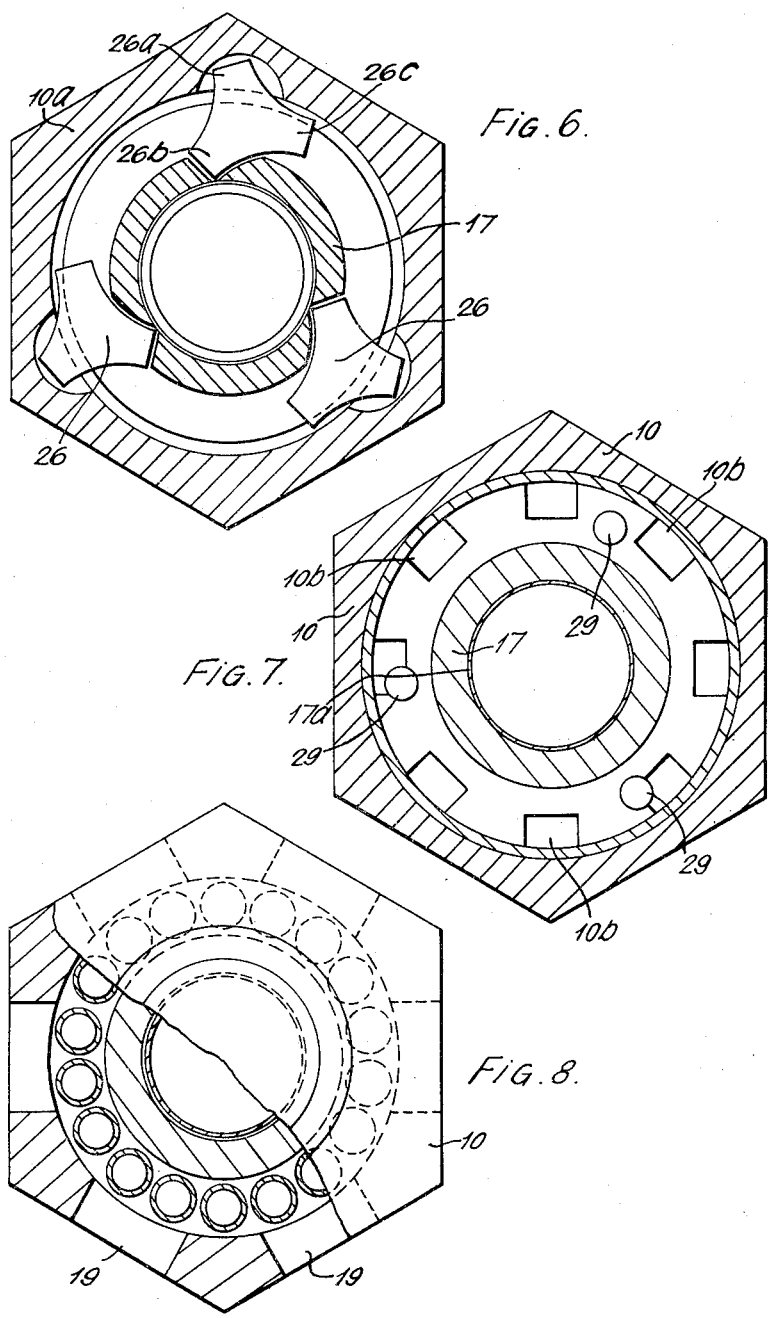

United States Patent Office 3,230,148
Patented Jan. 18, 1966

3,230,148
NUCLEAR FUEL COMPONENTS
Alan Thomas Hooper, Weymouth, Dorset, England, assignor to United Kingdom Atomic Energy Authority, London, England
Filed Aug. 1, 1963, Ser. No. 299,228
Claims priority, application Great Britain, Aug. 16, 1962, 31,569/62
4 Claims. (Cl. 176—43)

This invention relates to nuclear fuel components formed as composite components built up with a number of highly rated fuel artifacts, e.g., of ceramic or graphite.

Ceramic fuel, necessary to withstand high temperature in the high temperature reactor core, is a poor structural material and requires supporting in such a way as to allow for dimensional changes which occur under the effects of heat and irradiation whilst being restrained against vibrations and other movements which might be induced by coolant flow or other means. A convenient shape to form artifacts is in short tubular lengths and it is with a supporting means for this particular shape of fuel body that the present invention is applicable.

According to the present invention, a core component, for a nuclear reactor, comprises an annular row of spines, each spine acting to retain fissile fuel bodies, and each spine being joined by links to at least one of the adjacent spines so as to allow relative articulation between adjacent spines. The component is adapted for positioning in an annular coolant passage in a reactor core, the component being spaced from the coolant passage walls by projections extending from links between the spines.

The invention will now be described with reference to the accompanying drawings, which show fuel assembly constructions, which differ only in the form and disposition of the links between the spines of the component and a method of supporting the component.

In the drawings,

FIG. 5 is an axial cross-section through an assembly shown how it is supported in a core, FIGS. 6, 7 and 8 are cross-sections on the lines VI—VI; VII—VII and VIII—VIII of FIG. 5.

Figure 1:
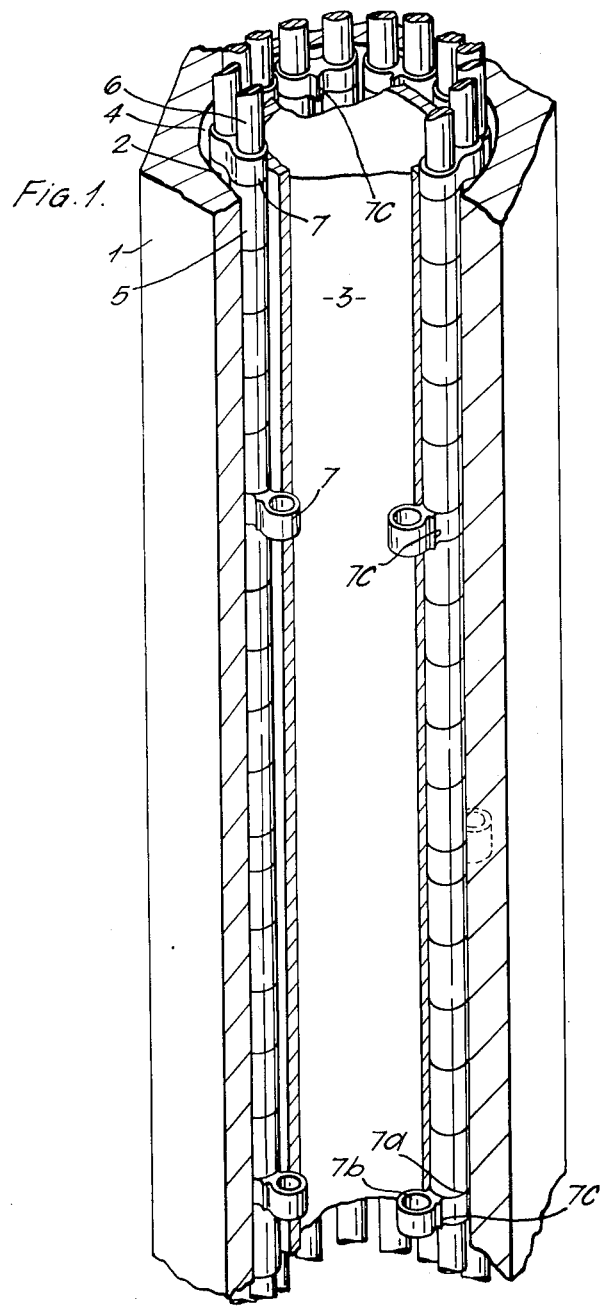
FIG. 1 is a diagrammatic perspective view of one form of assembly.

Referring firstly to FIG. 1 there is shown a fuel assembly having a columnular component 1 hexagonal in cross-sections normal to its axis and having a circular section bore 2. A number of such components of ceramic moderating material assembled in juxta-position would form a reactor core structure.

Within the bore 2 of each component a central tube or rod 3, as the case may be, is placed to define an annular coolant channel 4 for the nuclear fuel. The fuel body is in the form of thin walled cylinders 5 which are threaded on to spines 6 and arranged in an annular row in the space 4. The spines 6 are linked at intervals along their lengths to adjacent spines in the row by links 7 which have two eye portions 7a, 7b, whose centres are spaced such that they can engage two adjacent spines. The links also have projections 7c which make contact with the inner or outer wall of the annular coolant space 4 alternately. In this manner the outer component 1, the central tube or rod 3 and the annular assembly of fuel, spines and links are centered relative to one another, discrepancies due to manufacturing tolerances, differential thermal expansions or irradiation effects being accommodated by deflection of the spines.

Figure 2:
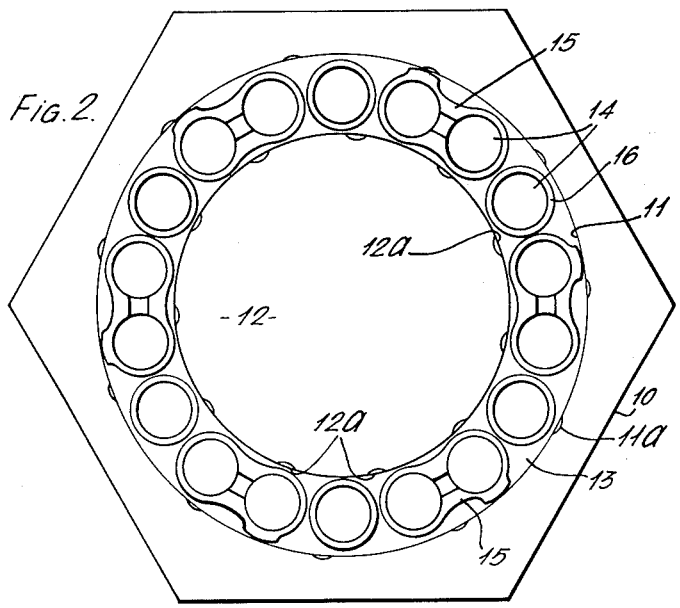
FIG. 2 shows cross-sectional view of a further assembly.
Figure 3:
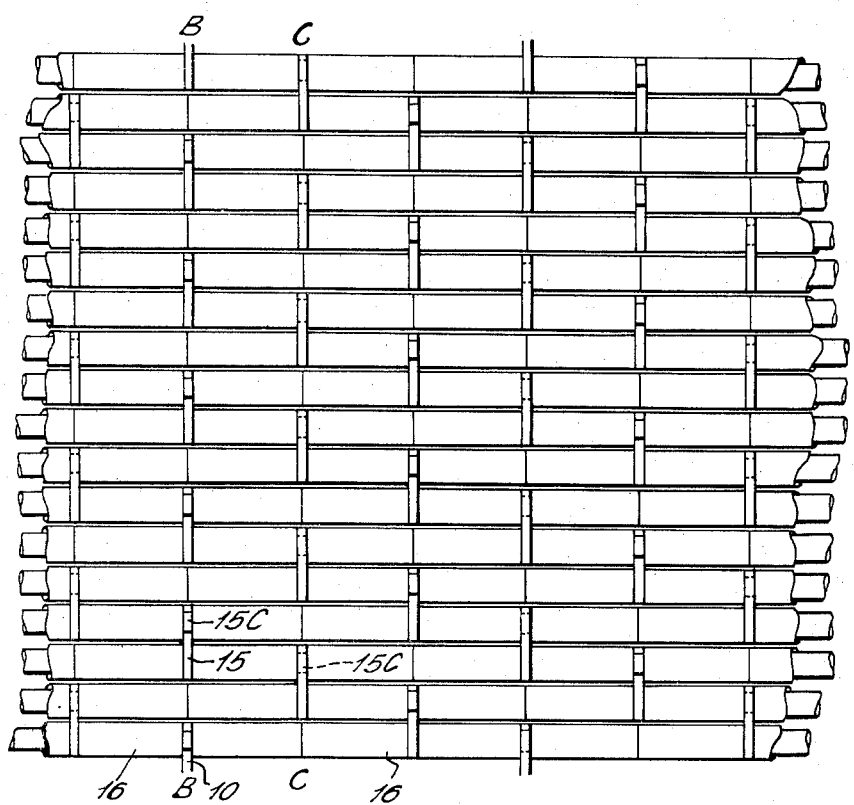
FIG. 3 is a developed view of the annular row of the fuel supporting core component.

In the second embodiment the fuel assembly comprises a hexagonal column 10 shown in a cross-section in FIG. 2 having a longitudinal bore 11 within which a rod or tube 12 extends co-axially, the latter being of such an outer diameter that an annular gap 13 is formed similar to the gap 4 in FIG. 1. The adjacent surfaces of the bore 11 and the rod or tube 12 are formed with grooves 11a, 12a respectively approximating to a multistart helix—to encourage flow of coolant in a helical path. An annular row of supporting spines 14 within the gap 13 are linked at intervals along their length as in the previously described embodiment by links 15. The latter are spaced at different positions axially such that on any cross-section through the links normal to the longitudinal axis of the bore, alternate pairs of spines are linked together to further encourage a helical flow direction of coolant within the annular channel. The relative positions of the links are best seen from the developed view of the row shown in FIG. 3.

Fuel cylinders 16 are threaded on the spines.

Figure 4:
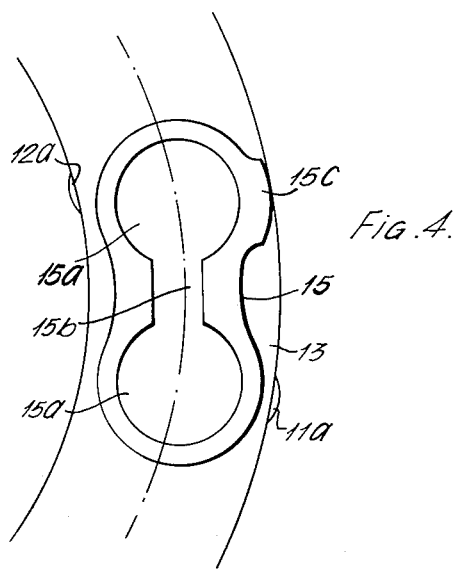
FIG. 4 shows to an enlarged scale, one form of link for the component of FIG. 3.

The links 15, one of which is shown in FIG. 4 to an enlarged scale, have two eyes 15a for embracing two adjacent spines and linking them together. The eyes are joined by a slot 15b which contributes to the cross-sectional area of the coolant flowpath. Each link has a projection 15c with an outer arcuate edge which abuts one or other of the walls of the annular gap 13 forming the coolant channel. In FIG. 4 the projection 15c is shown in abutment with the outer wall of the channel this being representative of a section at a position B—B of developed view in FIG. 3. The next series of links at section C—C (FIG. 3) are inverted so that their projections 15c abut, or extend towards, the radially inner wall of the coolant channel. This arrangement is preserved along the whole length of the spines and imparts a degree of flexibility to the assembly.

Suitable means, not shown, are provided for supporting the end parts of the assembly.

The column 10 here described and illustrated as hexagonal which can be assembled into a composite reactor core may equally well be square or triangular in cross-sections transverse to the axis. Alternatively, a reactor core may be a solid block of moderator material with a lattice of cylindrical holes each adapted to receive an inner tube or rod, and define an annular passage in which an annular row of fuel carrying spines is supported.

The coolant flow may be in either axial direction through the coolant channel with suitable structure at one or both ends of each channel for compensating for differential movement between the inner tube, or rod, annular row of spines and outer column.

Where it is a requirement that the assembly should accommodate a control rod then the component may be supported as shown in FIGS. 5–8 wherein the central control rod guide tube 17, considered here as being vertical but may be arranged in any attitude, receives a control rod from below. The outer hexagonal column and fuel cylinders on spines are the same as shown in FIG. 2 and bear the same reference numerals.

As shown in FIG. 5 the hexagonal column 10 has an end cap 18 at its upper end where its side walls are formed with coolant outlet slots 19. The end cap 18 abuts a rigid steel top plate 20 forming a part of the reactor core structure. At its lower end the parts of the assembly are individually supported so as to allow dimensional changes between the parts to occur differentially if the conditions so demand. The central tube 17 comprises a tube of moderator material lined with metal liner 17a slidable within tube 17 which separates from the tube near its lower end where it is allowed to depend into a perforated baseplate 21. At its free end the liner is of increased thickness and carries a nut 17b. The perforated baseplate provides the resistance against which the fuel supporting component can be resiliently supported and this is achieved by a spring 22 arranged to urge the component against the top plate the spring reaction being taken by the perforated baseplate.

The spring 22 is carried in a nosepiece 23 which has an external conical surface 23a for sealing on the perforated baseplate and an internal shoulder 24 forming one abutment for the spring. Outside the perforated baseplate the nosepiece 23 enters the bore in the column 10, the lower end of the latter being provided with a steel extension piece 10a spaced from the perforated baseplate. The other abutment for spring 22 is a ring 25 mounted on the central control rod guide tube 17. In contact with the opposite face of the ring 25 are three equispaced pads 26. The pads 26 are arranged to transmit the spring force from the ring 25 on to the three parts of the fuel element—the outer column 10, the fuel supporting spines 14 and the inner control rod tube 17. To this end the pad 26 has three radial projections 26a, 26b and 26c each of which extend to engage respectively a shoulder 27 in the outer component 10, an external slot 28 in the central tube 17 and a push rod 29. The latter extends through the bore of the column and are engaged by a dowel 30a projecting from a ring 30 which transmits the spring force to the ends of the spines 14. Thus the three relatively displaceable parts, the outer component, the inner control rod guide tube and the annular assembly of fuel carrying spines are all free to move axially independently of one another. Moreover, cooling of the spring 22 the sole dynamic member of the assembly is cooled by coolant diverted from the central coolant tube via slots 31 in the wall.

The internal surface of the extension tube 10a has multistart helical grooves 10b to impart a swirling motion to the coolant flowing through slots 30—the grooves 10b being of the same hand as those grooves in the annular channel.

To remove the assembly from the perforated baseplate the top plate 20 is released and lifted off and the assembly lifted axially off the perforated baseplate, the nut 17b serving to retain the nosepiece and the spring 22.

I claim:

1. A nuclear reactor fuel assembly comprising a column of neutron moderating material, means defining a bore hole in the column, a cylindrical member, means mounting said cylindrical member co-axially within the bore hole, an annular fluid coolant channel defined between the bore hole and the inner cylindrical member, a core component comprising an annular row of spines with at least one hollow tubular fissile fuel member threaded on each spine, links joining adjacent spines so as to allow relative articulation between adjacent spines, means supporting said core component in the annular fluid coolant channel co-axially with the inner cylindrical member and means for maintaining the relative position of the column, the inner cylindrical member and the core component which includes a resilient means acting between a fitting at one end of the bore hole and a plurality of support members within said hole each of which members act to transmit a force exerted by the resilient means on to the column, the inner cylindrical member and the core component.

2. A nuclear reactor fuel assembly as claimed in claim 1, comprising an annular coolant channel defined between inner and outer cylindrical walls, an annular row of fuel retaining spines within said channel, a plurality of tubular fuel bodies threaded on said spines, an elastic device between a fixed abutment and one face of a plurality of triangular support members and means transmitting the force of the spring to the fuel supporting spines and the inner and outer cylindrical walls through the other face of the triangular support members.

3. A nuclear reactor fuel assembly comprising a fuel bearing spine, members providing opposed walls which define an axially extending coolant channel, means supporting a spine within the channel with clearance whereby the spine can be swept by coolant and means for providing a yieldable restraint on the spine and the opposed walls of the coolant channel against relative axial displacement said means comprising a pad providing triangulated supports for bearing against the spine and the opposed walls and a resilient device acting on the pad maintaining the pad in contact with the spine with the triangulated bearing points against the spine and the opposite walls.

4. A nuclear reactor fuel assembly comprising a column of neutron moderating material, means defining a bore hole in the column, a cylindrical member, means mounting said cylindrical member co-axially within the bore hole, an annular fluid coolant channel defined between the bore hole and the inner cylindrical member, a core component comprising an annular row of fuel retaining spines with a plurality of hollow tubular fissile fuel member threaded on each spine, links joining adjacent spines so as to allow relative articulation between adjacent spines, means supporting said core components in the annular fluid coolant channel co-axially with the inner cylindrical member, and means for maintaining the relative position of the column, the inner cylindrical member and the core component, including means for yieldably restraining the fuel retaining spines against axial movement relative to one another and relative to the walls.

References Cited by the Examiner

UNITED STATES PATENTS

| 3,039,947 | 6/1962 | Fortescue et al. | 176—71 |
| 3,076,753 | 2/1963 | Bell | 176—84 X |
| 3,111,477 | 11/1963 | Bean | 176—58 |
| 3,142,627 | 7/1964 | Emerson | 176—78 |

FOREIGN PATENTS 920,577  3/1963  Great Britain.

CARL D. QUARFORTH, *Primary Examiner.*

REUBEN EPSTEIN, *Examiner.*